(12) United States Patent
Vanderstraeten et al.

(10) Patent No.: US 10,988,306 B2
(45) Date of Patent: Apr. 27, 2021

(54) DISPENSER COMPRISING PRESSURE CONTROL DEVICE, METHOD OF MANUFACTURING DISPENSER PARTS AND METHOD OF ASSEMBLY

(71) Applicant: Gojara, Destelbergen (BE)

(72) Inventors: Erwin Vanderstraeten, Gentbrugge (BE); Dirk De Cuyper, Destelbergen (BE); Tom Anthierens, Destelbergen (BE)

(73) Assignee: Gojara, Destelbergen (BE)

( * ) Notice: Subject to any disclaimer, the term of this patent is extended or adjusted under 35 U.S.C. 154(b) by 96 days.

(21) Appl. No.: 15/774,610

(22) PCT Filed: Nov. 10, 2016

(86) PCT No.: PCT/EP2016/025142
§ 371 (c)(1),
(2) Date: May 9, 2018

(87) PCT Pub. No.: WO2017/080678
PCT Pub. Date: May 18, 2017

(65) Prior Publication Data
US 2018/0319572 A1    Nov. 8, 2018

(30) Foreign Application Priority Data

Nov. 10, 2015  (BE) .................................. 2015/5737
May 25, 2016   (WO) ................. PCT/EP2016/061840

(51) Int. Cl.
*B65D 83/38*   (2006.01)
*B29C 65/16*   (2006.01)
(Continued)

(52) U.S. Cl.
CPC .............. *B65D 83/38* (2013.01); *B29C 65/16* (2013.01); *B29C 65/1616* (2013.01);
(Continued)

(58) Field of Classification Search
None
See application file for complete search history.

(56) References Cited

U.S. PATENT DOCUMENTS 5,492,467 A * 2/1996 Hume .................... B29C 45/27
                                                          264/328.15
5,886,058 A   3/1999 Van Erden et al.
(Continued)

FOREIGN PATENT DOCUMENTS

EP     0856537 A2 *  8/1998
EP      856537 A2    8/1998
(Continued)

OTHER PUBLICATIONS

International Search Report for application No. PCT/EP2016/061840.

*Primary Examiner* — Matthew J Daniels
*Assistant Examiner* — Mohammad M Ameen
(74) *Attorney, Agent, or Firm* — N.V. Nederlandsch Octrooibureau; Catherine A. Schultz; Katelyn J. Bernier

(57) ABSTRACT

The present invention relates to a method for manufacturing a pressurizable cylindrical vessel for use in a pressure control system for maintaining a constant predetermined pressure in a fluid container configured to dispense when in use a fluid contained in said fluid container at said constant predetermined pressure, characterized in that the manufacturing is by injection moulding. The invention also relates to a method for assembling a pressurizable fluid container configured to dispense when in use a fluid contained in said container at a constant predetermined pressure. In addition, the invention relates to a pressurizable cylindrical vessel, a pressurizable unit, a pressure control system, a bottom plate and a dispenser; as well as their methods of manufacturing.

(Continued)

In a final aspect the invention relates to uses of said parts in a bag-on-valve type packaging or metal can type packaging.

3 Claims, 11 Drawing Sheets

(51) Int. Cl.
*B29C 65/00* (2006.01)
*B65D 83/66* (2006.01)
*B29L 31/00* (2006.01)

(52) U.S. Cl.
CPC ...... *B29C 65/1635* (2013.01); *B29C 65/1677* (2013.01); *B29C 66/1222* (2013.01); *B29C 66/71* (2013.01); *B29C 66/91941* (2013.01); *B65D 83/384* (2013.01); *B65D 83/663* (2013.01); *B29C 65/1661* (2013.01); *B29C 66/1122* (2013.01); *B29C 66/1224* (2013.01); *B29C 66/232* (2013.01); *B29C 66/542* (2013.01); *B29C 66/545* (2013.01); *B29C 66/5432* (2013.01); *B29C 66/612* (2013.01); *B29C 66/65* (2013.01); *B29C 66/919* (2013.01); *B29C 66/939* (2013.01); *B29L 2031/7142* (2013.01)

(56) References Cited

U.S. PATENT DOCUMENTS

| 5,979,694 A | * | 11/1999 | Bennett | B65D 15/14 220/611 |
|---|---|---|---|---|
| 2007/0125809 A1 | | 6/2007 | Regan et al. | |
| 2015/0076164 A1 | | 3/2015 | De Cuyper et al. | |
| 2015/0300568 A1 | | 10/2015 | Smits et al. | |

FOREIGN PATENT DOCUMENTS

| WO | 2005/082744 A1 | 9/2005 |
|---|---|---|
| WO | 2013082680 A2 | 6/2013 |
| WO | WO-2013-082680 A2 * | 6/2013 |
| WO | 2014083531 A2 | 6/2014 |
| WO | 2016004486 A2 | 1/2016 |
| WO | 2016/120404 A1 | 8/2016 |

* cited by examiner

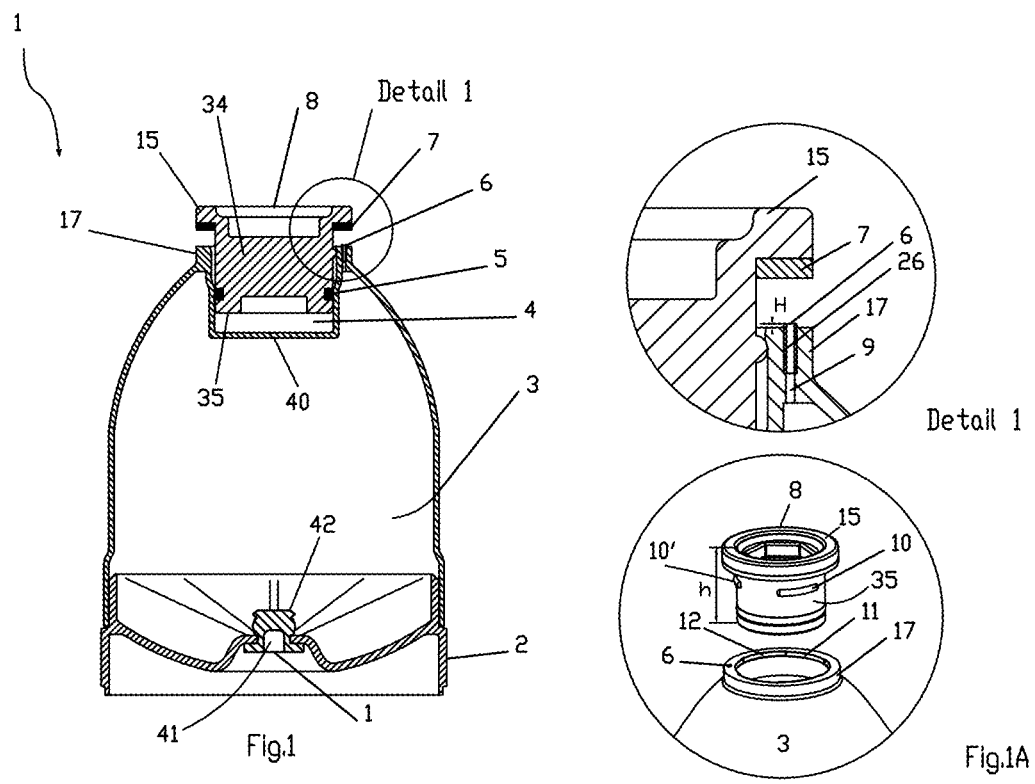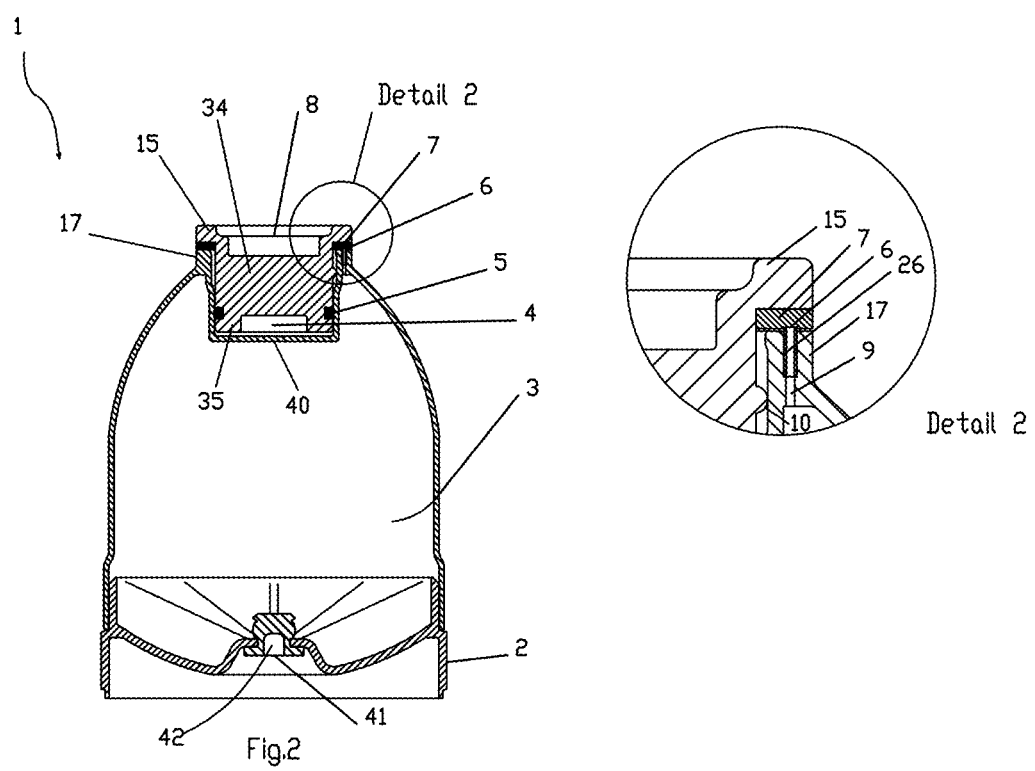

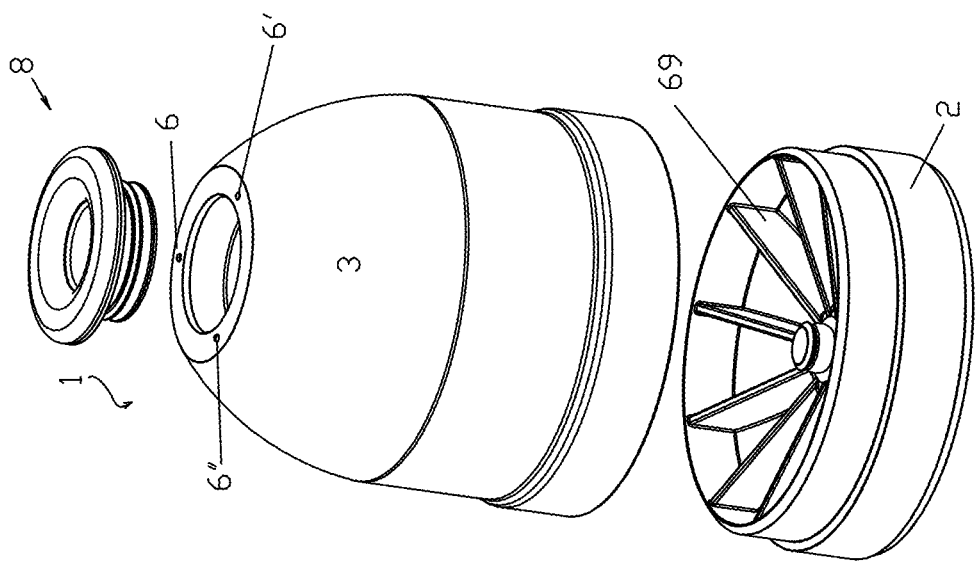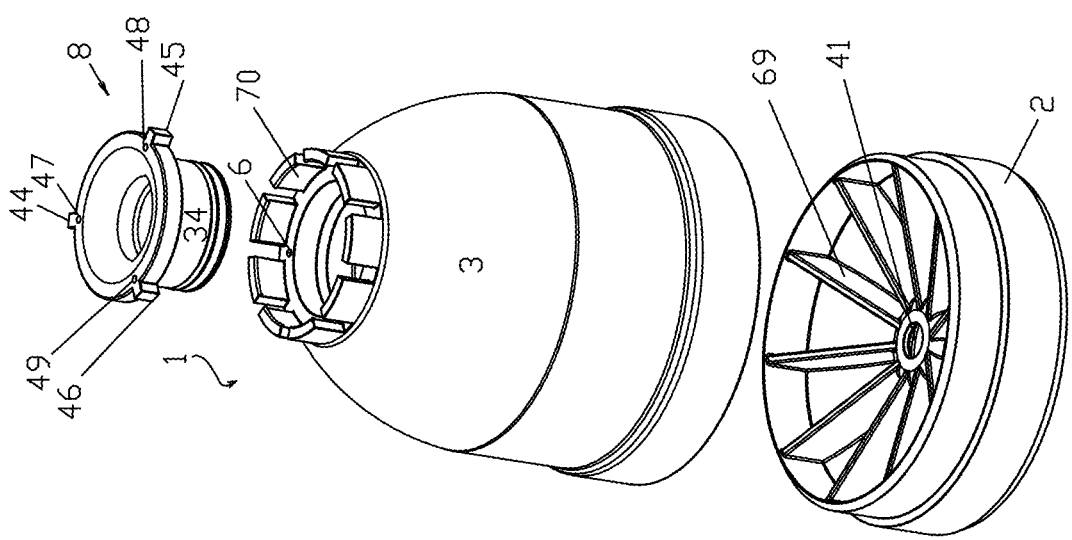

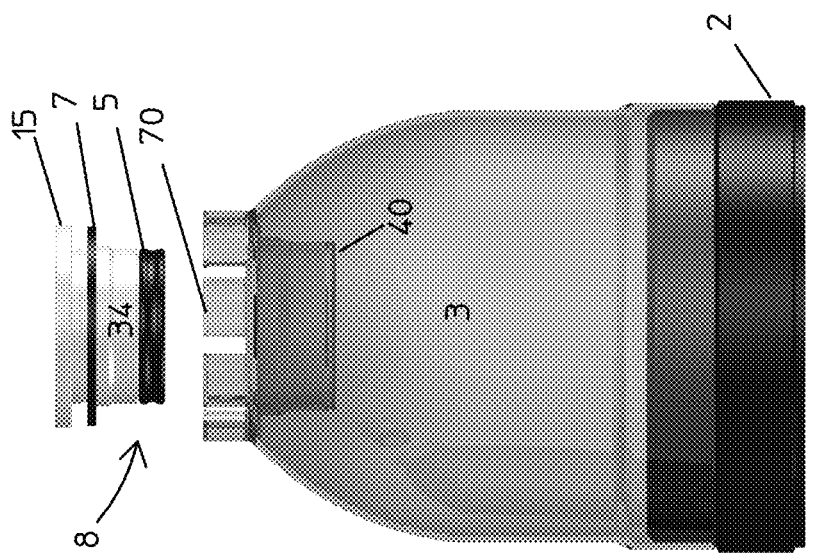
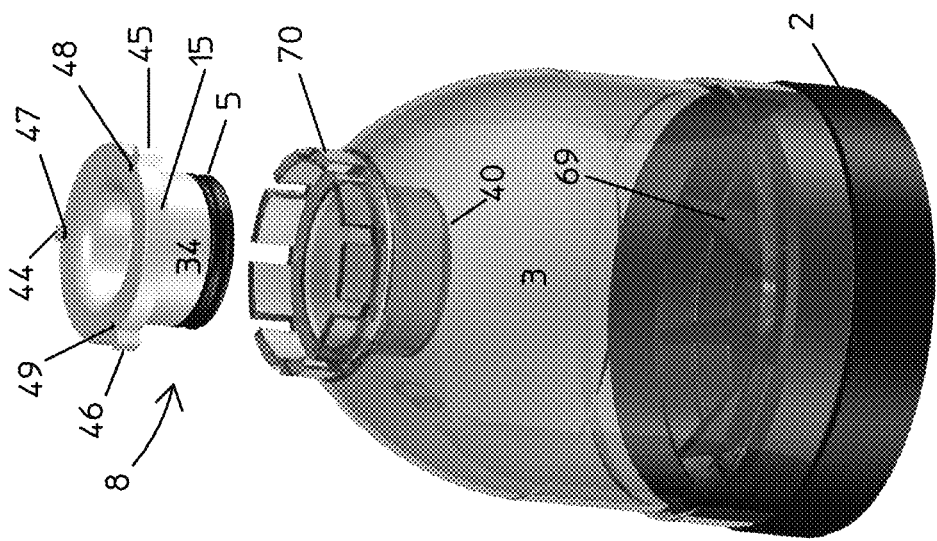
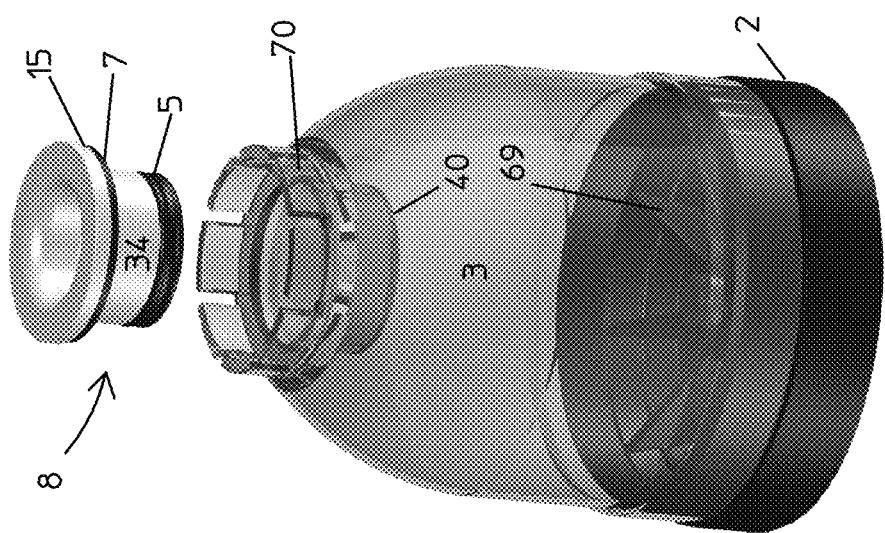
fig.9
fig.8
fig.7

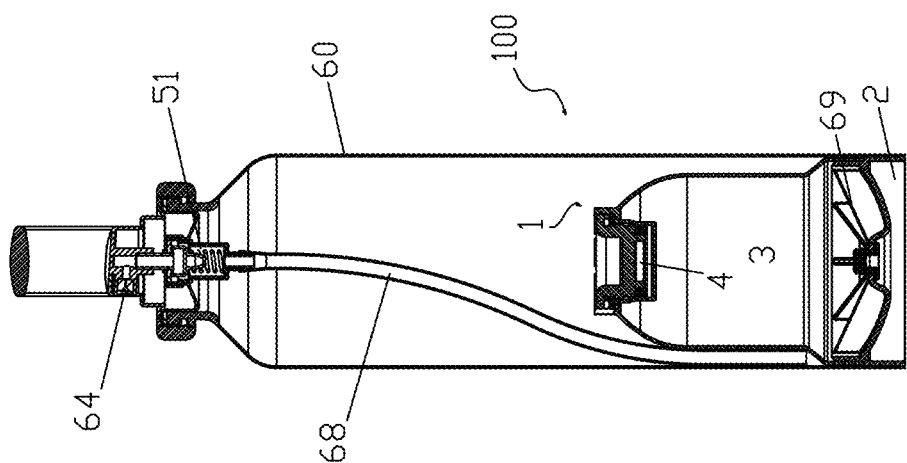
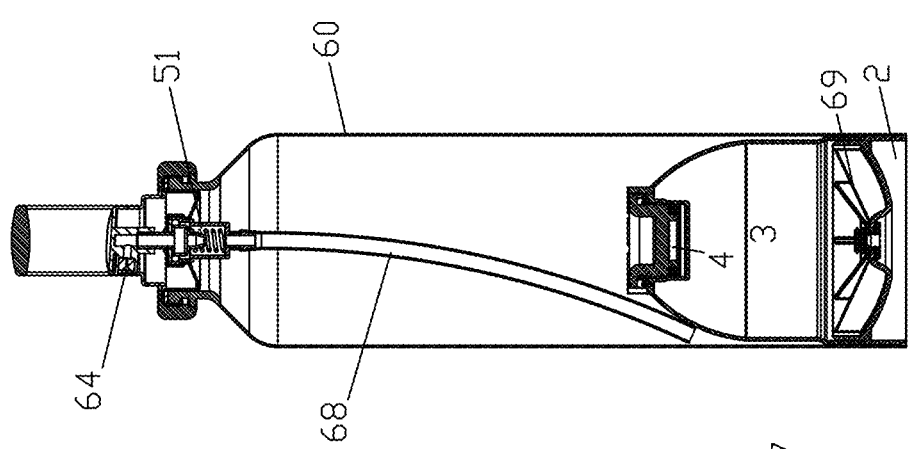
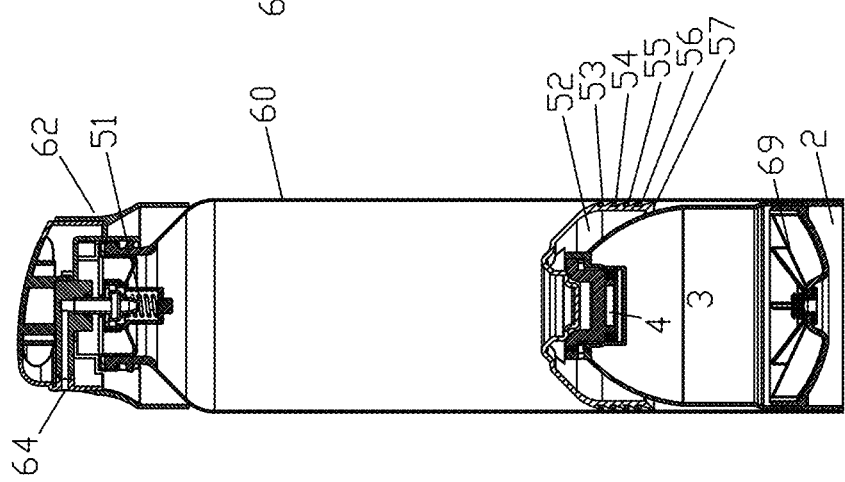

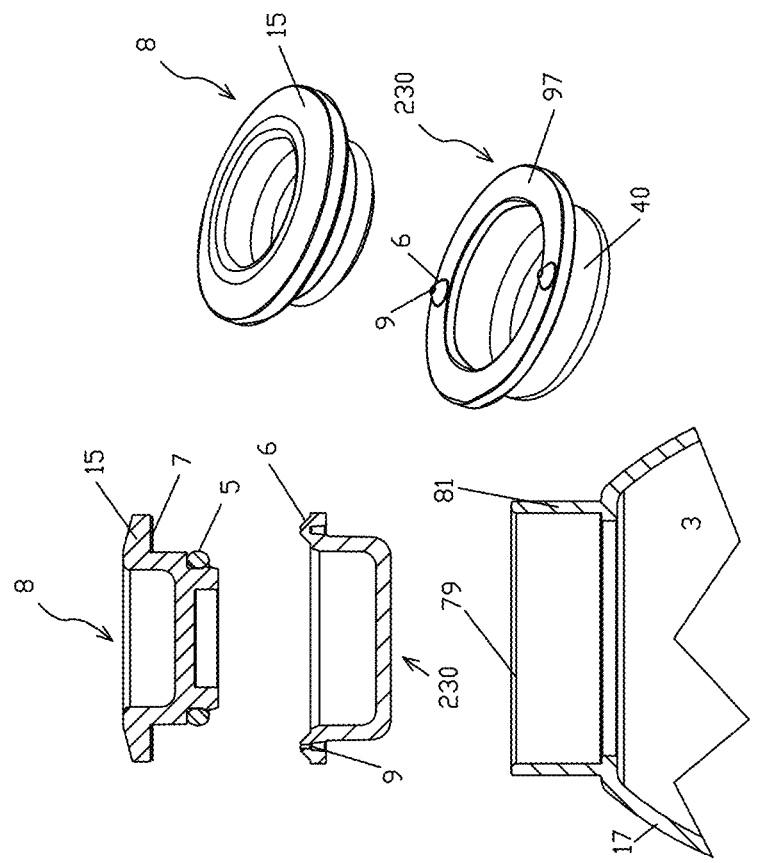
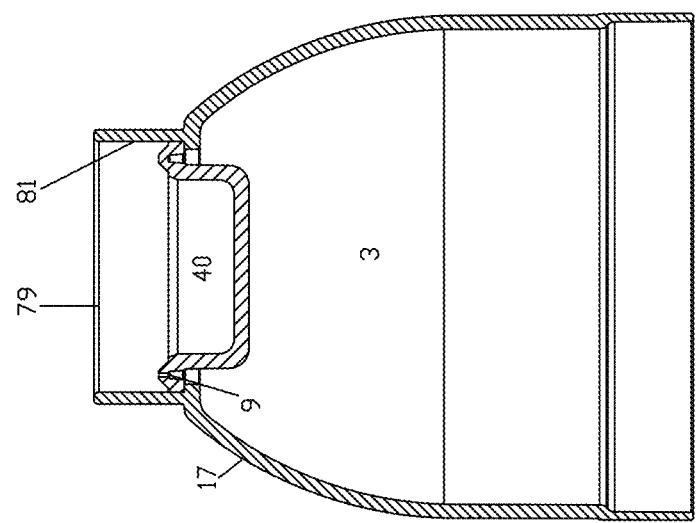
Fig.16

DISPENSER COMPRISING PRESSURE CONTROL DEVICE, METHOD OF MANUFACTURING DISPENSER PARTS AND METHOD OF ASSEMBLY

TECHNICAL FIELD

The present invention relates to a dispenser, comprising a pressure control device that is both cheap and strong, for packing of filling product and delivery of product under pressure. The present invention further concerns a method for manufacturing said dispenser comprising a pressure control device. The present invention also provides an advantageous method of assembly of said dispenser comprising a pressure control device. The invention is of particular importance in the technical fields of dispensers provided to deliver a product output at a predetermined and constant pressure, such as in the field of aerosol sprays. The invention finds uses in packaging such as spray cans, foam dispensers. The filing product can be a household product such as an air freshener, a toiletry article, a cosmetic, a beverage or a food. It can also find application in pharma.

Devices of the invention are particularly useful as replacements for systems based on chlorofluorocarbon propellants, mixtures of volatile hydrocarbons or ethers, as they provide a more environmentally friendly alternative based on compressed air or inert gas. Preferably the container of the dispenser is made of plastic and replaces aluminum cans. This provides further economic and ecological benefits. However it can also provide a pressure control device for aluminum cans, for instance to provide a pressure control device in a bag-on-valve type of packaging. This ensures for constant delivery of product output at a predetermined pressure.

The invention delivers a dispenser system that is capable of being mass produced.

BACKGROUND

Aerosol dispensing devices are well-known. In accordance with Aerosol Dispensers Directive 75/324/EEC the term "aerosol dispenser" means any non-reusable container made of metal, glass or plastic and containing a gas compressed, liquefied or dissolved under pressure, with or without a liquid, paste or powder, and fitted with a release device allowing the contents to be ejected as a solid or liquid particles in suspension in a gas, as a foam, paste or powder or in a liquid state.

Aerosol dispensers based on metal spray cans and propellants are well-known.

The metal spray cans are being replaced by plastic alternatives, such as polyethylene terephthalate (PET) bottles. However, the plastic material needs reinforcements to be able to successfully hold a pressurized product load and to pass regulatory requirements such as a drop test and/or pressure test as required by the "Plastic aerosol dispensers—Technical requirements". Particularly, the plastic aerosol dispenser needs to pass a drop test in a random position from a height of 1.8 meters onto a concrete surface. It also needs to pass after aging conditions of for example 3 months storage at 40° C. or 6 hours storage at 50° C.

Several propellants that are hazardous and/or dangerous to the environment, such as chlorofluorohydrocarbons, are being banned.

Chlorofluorocarbons were once frequently used as propellant in spray cans. A chlorofluorocarbon (CFC) is an organic compound that contains only carbon, chlorine, and fluorine, produced as volatile derivative of methane, ethane, and propane. They were commonly known by the DuPont brand name Freon. The most common representative was dichlorodifluoromethane. Many CFCs have been widely used as propellants in aerosol applications. Because CFCs contribute to ozone depletion in the upper atmosphere, the manufacture of such compounds has been phased out and they are being replaced.

Common replacements are mixtures of volatile hydrocarbons, typically propane, n-butane and isobutane. Dimethyl ether (DME) and methyl ethyl ether are also used; All these have the disadvantage of being flammable. Consequently, the pressurized packaging containing them, needs to be labelled with a hazard symbol. This is deterring to consumers.

Medicinal aerosols such as asthma inhalers use hydrofluoroalkanes, such as 1,1,1,2-tetrafluoroethane (HFA 134a) or 1,1,1,2,3,3,3-heptafluoropropane (HFA 227) or combinations of the two. However, their price is cost prohibitive for use in the food and beverage industry.

Manual pump sprays can be used as an alternative to a propellant. These have the disadvantage of requiring repetitive activation of the spray using extra power as opposed to a hydraulic release valve or trigger in a spray can. This is a disadvantage for users of consumer products and industrial aerosols.

Alternatives are being developed based on pressurized air or an inert gas such as nitrogen.

If aerosol cans were simply filled with compressed gas, such as pressurized air or an inert gas such as nitrogen, it would either need to be at a dangerously high pressure and require special pressure vessel design like in gas cylinders, or the amount of payload in the can would be small, and rapidly deplete.

A type of packaging based on pressurized air or nitrogen are bag-on-valve type systems. The bag-on-valve system consists of an aerosol valve with a welded bag. They are combined with an aluminum or plastic, often PET-based, container. The bag or pouch is usually opaque silver in colour as it is based on a flexible multilayer laminated bag made from layers of nylon, polyethylene and aluminum. This type of packaging provides a barrier package for liquids, gels, creams and lotions, keeping high product integrity and protection against oxygen exposure. A disadvantage in this system however remains that pressure delivery is not constant over time. Product will leave the system at a higher pressure when the packaging is first used versus when the product load is almost gone. Especially for pharmaceutical applications, where product delivery to a patient should be constant, this poses a problem. Also for the delivery viscous products such as gels and creams, a minimum pressure needs to be available to provide complete product emptying. In order to recycle the raw materials, the aluminum based flexible packaging needs to be separated from the can or bottle. This is time-consuming.

Alternatives have been described based on a rigid PET-container.

In EP 2 791 030 a pressure container packaging type is described, wherein a plastic blow molded container provided with reinforcements is provided with an injection molded base plate. A Nicholson plug is provided in the based plate for pressurization of the container from the bottom. The bottom plate is either flat or dome-shaped. In this design, the payload comes in contact with the bottom plate. This can cause environmental stress cracking. Especially if plastic is locally crystalized, as can be the case around the opening for receiving the Nicholson plug, there is an increased risk for environmental stress cracking and product failure.

In order to prevent a filing product from coming into contact with the outer wall and with the pressure gas in case of a pressurized container, a flexible inner container is inserted into the container.

Alternatively, a two-chambered container system is provided. Two chambers are obtained by fitting a chamber partition in the container. The chamber partition may be provided or not with a pressure control valve and the chambers may be under pressure or not. Details of the pressure control valve, its operation or assembly in the container, are not provided.

In another embodiment, a pressure container of the "bottle in a bottle" type is proposed to provide reinforcement means and withstand pressure ranging from 20 to 50 bare and more. Stretch blow molding is disclosed as manufacturing method for providing containers which are strong and lightweight and with better strength properties. It is not described how the product load is prevented from flowing from the holding chamber into the pressure delivery part.

EP 1 725 476 provides a pressure control device with a cylinder obtained by injection blow moulding from polyethylene terephthalate (PET) pre-forms made on a separate production line. It teaches that the orientation of the stretched PET material during the blowing process leads to a higher crystalline structure which gives high strength and good gas barrier properties. The cylinder is open at the top. It is provided with an insert that covers the opening. The insert is provided with the actual pressure control device. The pressure control device comprises a large number of parts and simplification is desirable. The pressure is controlled by means of a valve mechanism wherein a stem with a broader cylindrical end portion protruding from a piston is used to dynamically open or close a sealing material. The valve mechanism of this type of dispenser is sensitive to damage, among others at the assembly stage, which can lead to instabilities in the working pressure, causing the system sometimes to fail. In addition, this mechanism is made out of a large number of parts and requires a labor intensive production process. The insert is laser-welded to the cylindrical pressure vessel. For this reason the insert is at least partly impregnated with a infrared or laser energy absorbing material known as "carbon black". Hence, also in the number of process steps, less complexity is desirable.

In an improvement, provided by WO 2014/083531, the injection blow moulded cylinder obtained from a pre-form of PET is modified by cutting off the bottom part. It is provided with a ring-shaped insert and a pressure control device as provided by EP 1 725 476 (WO 2005/082744). The vessel is expensive to produce and technically challenging. The assembly process requires two laser-welding steps: one for attaching the insert to the pressure vessel and a second one for attaching the pressure vessel to a bottle. The number of manufacturing and assembly steps is thereby even increased.

Hence, further improvements are desirable.

There remains a need in the art for a cheap, light-weight yet strong pressure-resistant pressure control device and pressure control system. It would be highly advantageous if material and space consumption could be reduced to a minimum, making the production process economically feasible also for mass production. In addition, it would be beneficial for the assembly process to be improved. Compatibility with currently existing production lines for spray cans and bottles is highly desirable. It would be advantageous if a barrier packaging is provided wherein propellant and product load are kept separate.

SUMMARY OF THE INVENTION

Against this background, the invention provides in a method for manufacturing a pressurizable cylindrical vessel for use in a pressure control system for maintaining a constant predetermined pressure in a fluid container configured to dispense when in use a fluid contained in said fluid container at said constant predetermined pressure, according to claim 1. The method is characterized in that injection moulding is used. This is unusual as for reasons of strength a stretch blow moulding technique would be the method of choice for the production of vessels that can withstand pressure. It has the advantage that the vessels can be produced in a single step instead of first making a preform and biaxially stretching it into a vessel shape.

In another aspect, the invention provides in a method for manufacturing a bottom plate for the pressurizable cylindrical vessel, according to claim 6. The inventors have found that fortification of the bottom plate has for effect that the combination with the pressurizable cylindrical vessel obtained by injection moulded, is stronger.

In another aspect, the invention provides in a method for manufacturing pressure control means for the pressurizable cylindrical vessel, as provided in claim 10. In another aspect, the invention also provides in parts obtainable by a method according to the invention as provided in claims 11, 14 and 19, as well as combination of parts as provided in claims 15 to 17. A method for assembly of an aerosol dispenser is provided according to claim 20.

A main advantage of the present invention is the delivery of a light-weight yet strong pressure control device, unit and system that are economical to produce. The number of steps of production is reduced. Cheaper materials, such as the low IV thermoplastic polymer and PET without strengthening means, contribute to a more favourable cost position.

Production is compatible with existing production lines. This is advantageous for the delivery of cost competitive aerosol dispensers.

In a final aspect the invention provides in a method for assembling an aerosol dispenser according to an embodiment of the invention, as provided in claim 20.

In another final aspect, the invention provides in uses of a pressurizable cylindrical vessel, pressurizable unit or pressure control system according to claim 18. Use in a bag-on-valve type packaging has the advantage that a barrier is provided between propellant and product load. Selection of parts and combinations as provided by an embodiment of the invention provides reduced costs while meeting strength requirements for plastic aerosol dispensers and/or providing for a constant predetermined pressure.

Further embodiments are provided in the dependent claims.

BRIEF DESCRIPTION OF THE FIGURES

FIGS. 1-2 are graphic representations of a pressure control system (1) according to an embodiment of the invention, comprising a pressurizable cylindrical vessel made by injection moulding, a concave bottom plate with fortification pins and displaying the pressure control system in open (FIG. 1) and closed position (FIG. 2).

FIGS. 5 and 6 provide schematic representations of alternative pressure control systems according to the invention with bottom plate (2), pressurizable vessel (3) and pressure control means (8).

FIGS. 6, 7 and 8 provide 3D representations of alternative pressure control systems according to the invention. Note the liquid slot (7) in FIG. 20.

FIGS. 9 to 11 provide schematic representations of aerosol dispensers according to an embodiment of the invention.

FIG. 12 provides a schematic representation of a mould with and without the use of a slide.

FIGS. 16 and 17 provide schematic representations of further embodiments of the invention.

DETAILED DESCRIPTION OF THE INVENTION

Figure 3:
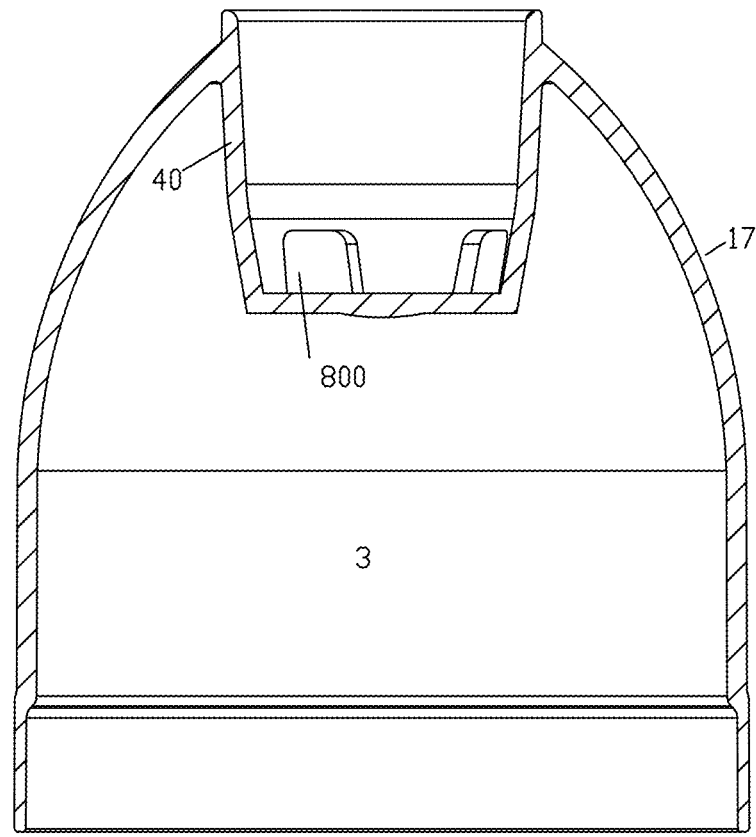
FIG. 3 provides a graphic representation of an alternative embodiment of an pressurizable vessel made by injection moulding, according to the invention.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings: "A", "an", and "the" as used herein refers to both singular and plural referents unless the context clearly dictates otherwise. By way of example, "a compartment" refers to one or more than one compartment. "About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed. "Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein. The recitation of numerical ranges by endpoints includes all numbers and fractions subsumed within that range, as well as the recited endpoints.

Expressions such as: "means for . . . " should be read as: "component configured for . . . " or "member constructed to . . . " and should be construed to include equivalents for the structures disclosed.

By the term "fluid" as used herein is meant a substance, such as a liquid or gas, that is capable of flowing, has no fixed shape, and offers little resistance to an external stress. By the term "fluid container" as used herein is meant an object, such as a receptacle, for holding a fluid. By the term "fluid dispensing container" or "dispenser" as used herein is meant a container that allows taking small amounts of fluid.

The inventors have come up with a solution to overcome problems with pressurized cans and bottles of the prior art. The improvement is based on the use of injection moulded pressure vessels in pressure control systems, devices and packaging. Contrary to the technical prejudice that dictates use of stretch blow moulding to provide bottles that are capable of withstanding pressure, the inventors found that injection moulded vessels can be used In particular, the invention provides in a method for manufacturing a pressurizable vessel for use in a pressure control system for maintaining a constant predetermined pressure in a fluid container configured to dispense when in use a fluid contained in said fluid container at said constant predetermined pressure, comprising the steps of:

forming out of a composition comprising a thermoplastic polymer, a pressurizable vessel, wherein said vessel on one end has a cylindrical insert configured to receive one or more pressure control means and on the opposite end has an opening configured to receive a form-matching bottom plate, characterized in that, said forming is by injection moulding.

Preferably said pressurizable vessel has a cylindrical shape. This shape without edges or corners is advantageous for pressure vessels. Clearly shapes such as an oval are equivalent.

By the term "insert" as used herein is meant a part of the cylindrical vessel wall provided as a means for the insertion of other parts, either in the form of a separate piece or as a part of the cylindrical vessel.

The process involves the injection moulding of a thermoplastic polymer, preferably polyethylene terephthalate (PET). Use of injection moulding instead of stretch blow moulding has for advantage that vessels can be produced in a single production step as the preliminary step of making preforms can be skipped. The process is cheaper. This makes mass production more accessible.

For injection-moulding of a PET composition, several options are suitable for use in the present invention. PET can either be used as such without the presence of additive, additives can be used to a PET composition without additives on an extrusion line, or PET with additives in the form of compounded granules, ready-for-use, can be selected.

The compounding of PET, i.e. mixing by melting plastic materials and additives causes the PET to transition to the molten state, which requires complete drying in order to obtain a residual water content of less than 0.05% and prevent hydrolysis of the polymer in the molten state. This hydrolysis would otherwise reduce the molecular mass, which is detrimental to the mechanical properties of the product. A drying cycle of 6 hours at 160° C.-180° C. for instance is typical.

In a preferred embodiment, said thermoplastic polymer is a polyethylene terephthalate, abbreviated as PET or PETE. PET is a thermoplastic polyester. Its production methods are well-known and available to a person skilled in the art. Use of PET as the thermoplastic polymer for injection moulding is advantageous to provide vessels with low crystallinity. The vessels obtained are transparent. PET vessels can be recycled.

The PET material is characterized by an intrinsic viscosity. Intrinsic viscosity or IV is a commonly used measure to express the chain length of the polymer. A longer chain length means a higher IV, and correspondingly stronger and tougher materials.

The intrinsic viscosity (IV) range of PET used for the manufacture of the vessels of the present invention is lower than a skilled person would expect. The pressurizable vessel of the present invention needs to be able to withstand deformation under high pressure, i.e. a pressure of typically 8 bar or more, and temperatures up to 55° C. Therefor the skilled person in the selection of a PET material for injection moulding, will be inclined to use high IV PET grades, and select an IV of at least 0.80. The reason for this selection is the requirement to provide strength.

Against this prejudice, the inventors found that it is advantageous to select the low strength PET materials instead. The PET material used in the present invention has an IV of 0.65 to 0.75; preferably 0.68 to 0.74; more preferably 0.69 to 0.73; most preferably 0.70 to 0.72. This material selection was found advantageous for obtaining a higher flow path/wall thickness ratio. Typically for PET the ratio is 1:50 to 1:60. This means that 1 mm injection can travel 50 mm far. This is a disadvantage for larger vessels. Travel distances beyond 50 mm will result in incomplete parts or parts with sink marks. The material defects will cause high production fall-outs. In embodiments of the invention, the wall thickness is around 1.40 mm. For the selected PET this results in a flow path of 90 mm from the injection point. This has a positive effect on the cost position and the size achievable for the pressurizable vessel.

PET homopolymer is based on terephthalic acid (TPA) en monoethylene glycol (MEG). Alternatively, the thermoplastic polymer is a PET copolymer, also known as modified PET material. The modification is preferably obtained by isophthalic acid (IPA), cyclohexane dimethanol (CHDM) and/or diethylene glycol (DEG). The modification has for effect that crystallization is slowed, the polymer composition melts at a lower temperature, the polymer composition will remain liquid longer.

In a preferred embodiment, the composition comprising a thermoplastic polymer is injected into the mould at a point located on the longitudinal axis of the mould. This can be achieved using a polymer injection sprue located on the longitudinal axis of the mould. Use of such a centrally located injection point has for advantage that the part produced will display isotropic shrinkage instead of anisotropic shrinkage. This is beneficial for the strength of the moulded part. Preferably injection moulding was at a mould temperature of 6° C. to 20° C. This is advantageous for energy consumption.

Preferably a method according to an embodiment of the invention, comprises the step of providing the wall of the cylindrical vessel with one or more fluid connections, preferably by drilling; more preferably by mechanical drilling or by laser drilling, most preferably by mechanical drilling. This has for effect that the cylindrical shape of the pressurizable vessel is easy to make with injection moulding. One or more fluid connections are provided later. They can be modified according to production specifications.

In another embodiment, the step of providing the wall of the cylindrical vessel with one or more fluid connections, is by injection moulding. The mould used for the injection moulding of the vessel can be equipped to provide the required fluid connections in the wall of the cylindrical vessel.

Most preferably a method according to an embodiment of the invention for manufacturing a pressurizable vessel uses a composition comprising thermoplastic polymer that is essentially free of additives, more preferably that is essentially free of strengthening means. By the term "essentially free of" is meant that additives and/or strengthening means are present in an amount of less than 2 weight percent, preferably less than 1 weight percent, more preferably less than 0.5 weight percent, most preferably less than 0.1 weight percent. In a most preferred embodiment, the composition is free of glass fibers and/or free of impact modifiers. In a another embodiment the only additives used in the vessel are nucleation or crystallization agents. This provides for a cheap composition, more economical process, product transparency, improved recyclability. The aspect of transparency is important as the laser welding process requires a transparent vessel.

In a preferred embodiment, the thermoplastic polymer is PET and the wall thickness of the pressurizable cylindrical vessel obtained is at least 1.3 mm, preferably at least 1.35 mm, most preferably 1.40 mm. The inventors have found that this thickness is sufficient for obtaining a pressurizable vessel without the use of fortification means. At this thickness it suffices to benefit from the additional thickness provided by a tight-fit fluid container, to resist pressurization of the container by means of a propellant. The thin walls are advantageous for reduction of material use.

In another aspect, the invention provides in a method for manufacturing a bottom plate for a pressurizable cylindrical vessel, wherein said vessel on one end has a cylindrical insert configured to receive one or more pressure control means and on the opposite end has an opening configured to receive a form-matching bottom plate, comprising the steps of: forming out of a composition comprising a thermoplastic polymer, preferably polyethylene terephthalate (PET) or polybutylene terephthalate (PBT) or a blend thereof, said bottom plate, characterized in that, said bottom plate is injection moulded in a shape that is form-matching to said opening of the pressurizable cylindrical vessel. The invention also provides a bottom plate obtainable or obtained by a method according to the invention for receipt of a pressurizable vessel according to the invention.

In a preferred embodiment, said bottom plate has fortification means, preferably mechanical or chemical fortification means. By the term "strengthening means", "reinforcing means" or "fortification means" as used herein, are meant means that can provide improvements in strength. Preferably said mechanical fortification means are one or more strengthening fins and/or a concave bottom plate and/or a wall thickness increase. Preferably said chemical fortification means are selected from a fiber fortification means, an impact modifier, a filler with strengthening properties and combinations thereof.

Use of fortification means in the bottom plate is advantageous for providing pressure resistance to the pressurizable vessel. The inventors have found that a strengthened bottom plate provides improved strength to the pressurizable vessel. This is important as the bottom part is the only part of the pressure vessel that comes in direct contact with the environment.

Inorganic fillers that may be suitable for reinforcing the polymer composition are inorganic fillers such as wollastonite, talc, beads (solid or hollow), clay and CaCO3.

Preferred fiber reinforcements are glass fibers, flax fibers, hemp fibers, carbon fibers, cellulose fibers, or combinations thereof. Especially preferred are glass fibers.

Preferably glass fibers are present in an amount of 2-50 w/w % of the composition comprising thermoplastic polymer used for manufacturing the bottom plate. More preferably the amount of glass fibers in the composition is 6-40 w/w %, even more preferably 10-30 w/w %, most preferably 15-25 w/w %. Typically compositions have either 5 or 20% glass fibers. Especially preferred is a combination of 5% glass fibers and 15% impact modifiers.

Suitable impact modifiers for use in this invention include any impact modifier compatible with PET based resins. Preferred impact modifiers include elastomers. Still more preferred suitable impact modifiers include elastomers based on polyethylene, butadiene or isoprene, such as polybutadiene, polyisoprene, natural rubber, styrene-butadiene (SBR), acrylonytrile-butadiene, styrene-butadiene-styrene or hydrogenated SBS block copolymers, or acrylonytrile-butadiene-styrene polymers containing high levels of butadiene, or or reactive impact modifiers based upon a glycidyl methatcrylate (GMA) terpolymer.

The impact modifiers that are especially useful are the ones modified to enhance the compatibility with PET based resins, such as polyethylene based elastomers. Examples of desirable polyethylene based elastomers include ethylene-acrylate copolymers such as ethylene/methylacrylate, ethylene/ethyl acrylate, ethylene/butyl acrylate and ethylene/methylacrylate/glycidyl methacrylate, or ethylene/vinyl acetate copolymers, or the copolymers of butadiene/MMA/styrene.

Suitable impact modifiers also include those with a core-shell structure. These core-shell modifiers normally contain a hard shell from methylmethacrylate copolymers and a core made from either butadiene methacrylate/butadiene-styrene copolymer or butyl acrylate copolymers. Examples of suitable core-shell impact modifiers include those available from Rohm & Haas Company under the trade name Paraloid.

Impact modifiers can contain added or reacted-to-the-chain compatibilizers. The compatibilizers are those functional groups that can enhance the compatibility or the miscibility of the impact modifiers with PET based resin.

Normal impact modifiers have a different reflective index than that of PET based resins, and the resultant container is white or hazy. One way to solve this is to use modified impact modifiers. Impact modifiers can be modified to match the reflective index of the impact modifiers to that of PET based resins so that the resultant container is clear. The impact modifiers can also be modified with core-shell technology such that the compatibility as well as the reflective index is matched with PET based resins. Further, the impact modifiers can be modified by manipulating the particle sizes of the modifiers such that they are below the visible light wave length, normally below 0.1 microns. All these modifications can be achieved by those skilled in the art.

The impact modifier is present in the thermoplastic polymer composition, preferably PET composition, in an amount effective to enhance the stress cracking resistance thereof relative to a composition not including the impact modifier.

Preferably impact modifiers are present in an amount of 5-30 w/w %) of the composition comprising thermoplastic polymer used for manufacturing the bottom plate. More preferably the amount of impact modifiers in the composition is 6-25 w/w %), even more preferably 8-20 w/w %, most preferably 10-15 w/w %).

The remainder of the composition is thermoplastic polymer, preferably PET. Preferably the amount of thermoplastic polymer, preferably PET, in the composition used for manufacturing the bottom plate is as high as possible. Preferably it is 18.5-89.5 w/w %), more preferably 25-75 w/w %, even more preferably 30-70 w/w %, most preferably 50-65 w/w %).

In addition other ingredients may be present such as a nucleating agent, a non-strengthening filler, a heat stabilizer, a mould-release agent, a lubricant, a pigment.

The thermoplastic polymer is partially crystallised due to the presence of a nucleation agent in the polymer material. The nucleation agent promotes the crystallisation of the polymer. Suitable nucleation agents may include inorganic nucleation agents such as talc and silica, organic nucleation agents such as high-molecular-weight carboxylic acids, or alkaline metal salts such as sodium benzoate, ionomer resins, and/or sorbitol-based salts.

In an embodiment, the thermoplastic polymer comprises in addition to the PET, a second thermoplastic resin to promote the dispersion of additives and pigments in the PET matrix. Preferably this second resin is also a polyester resin. It is however possible to use polycarbonate or polyamide resins. Preferably, the second polyester resin is polybutylene terephthalate (PBT) because its chemical structure is similar to that of PET what makes it compatible in PET. In addition its relatively high melting point of around 220° C. does not affect the general melting point of the matrix, of around 250° C.

Heat stabilizers which may be used in the composition include antioxidants of the hindered phenol family and secondary aromatic amines, secondary antioxidants such as thioethers, thioesters, and phosphites.

Mould-release agents which may be used in the composition, may include silicones, in particular silicone oils.

Lubricants which may be used in the composition, may include stearates such as calcium stearate or waxes of paraffin, modified or unmodified polyethylene, esters and montanic acid.

Fillers which may be used in the composition include organic fillers such as PTFE, PPS or PA powder or organic fillers such as talc, calcium carbonate, wollastonite, barium sulphate, kaoline, graphite, mica, silica and silicates.

Pigments that can be used in the thermoplastic material include titanium dioxide, oxides, hydroxides and sulphides of metal ions, molecules with an azo group, the phthalocyanine and anthraquinone family and carbon black. Carbon black is used as an additive to facilitate laser welding. Preferably a composition comprising thermoplastic polymer has 0.1-1.5 w/w % carbon black, expressed as weight of carbon black per total weight of the composition.

In another aspect, the invention provides in a method for manufacturing pressure control means for a pressurizable cylindrical vessel, comprising the step of: forming out of a composition comprising a thermoplastic polymer, preferably polyethylene terephthalate (PET), a pressure control means; characterized in that said forming is by injection moulding; preferably by injection moulding without use of a slide.

In another aspect the invention provides in a pressurizable cylindrical vessel obtainable or obtained by a method according to an embodiment of the invention.

Preferably the wall thickness of the pressurizable cylindrical vessel obtained is at least 1.3 mm, preferably at least 1.35 mm, most preferably 1.40 mm.

Preferably, a pressurizable cylindrical vessel according to an embodiment of the invention, is characterized in that a sprue mark is located on said cylindrical insert coinciding with the longitudinal axes of said cylindrical vessel and of said pressurizable insert and is located on the outside of said cylindrical insert facing the inside of said pressurizable vessel.

In a preferred embodiment, the pressurizable cylindrical vessel obtained has a diameter that is essentially form-matching with the diameter of said fluid container; preferably over a circumferential wall area of at least 1 cm. This has for effect that strengthening is provided by physical means.

In a preferred embodiment, the pressurizable cylindrical vessel is provided with a fluid connection connecting the interior and exterior of the second chamber, characterized in that said fluid connection is positioned outside the first chamber, i.e. the reference pressure chamber.

In a more preferred embodiment, the first chamber is a ring shaped chamber. This embodiment has the advantage that sealing in the chamber is done both on the inside and the outside of the same sealing member, preferably an O-ring. This has as advantage that it can be constructed with an open stopper, which provides a further weight advantage.

In a further aspect, the invention provides in a method for assembling a pressurizable fluid container configured to dispense when in use a fluid contained in said container at a constant predetermined pressure.

A method of assembly according to the invention may comprise the steps of:
providing a pressurizable cylindrical vessel as previously described,
attaching a form-matching bottom plate to said pressurizable cylindrical vessel thereby closing the opening of said pressurizable cylindrical vessel,
inserting one or more pressure control means into said cylindrical insert of said closed pressurizable cylindrical vessel thereby providing a pressure control system,
mounting a pressurizable fluid container over said pressure control system, characterized in that, the pressure control system is form-matching with the wall of the pressurizable vessel over a circumferential height of at least 1 cm, preferably at least 5 cm, most preferably at least 8 cm.

The effect of providing the vessel closely fit with the fluid container provides a physical reinforcement. The pressurizable cylindrical vessel is clamped in by the container. The container is thus providing support. The vessel will be able to withstand its pressurized content better. The larger the contact surface between the cylindrical vessel and the container, the more support and containment is provided.

In another preferred embodiment, a method for assembling a dispenser comprises the steps of: —providing an injection moulded pressurizable cylindrical vessel according to an embodiment of the invention,
providing an injection moulded bottom plate according to an embodiment of the invention,
attaching said bottom plate to said pressurizable cylindrical vessel thereby closing said pressurizable cylindrical vessel;
inserting one or more pressure control means according to an embodiment of the invention into said cylindrical insert of said closed pressurizable cylindrical vessel thereby providing a pressure control system,
mounting a fluid container, preferably obtained by injection stretch blow moulding, over said pressure control system and attaching it to said bottom plate;
providing said fluid container with a dispensing head and filling said container with a fluid load, or vice versa, and
pressurizing and closing said pressurizable cylindrical vessel, thereby providing said dispenser;
wherein both of said vessel and said fluid container are permanently connected to said bottom plate.

Injection stretch blow moulding comprises the following steps: injection moulding a pre-form, stretch blow moulding the preform into a container form, cutting off the bottom part to obtain a container with opening at the bottom. Said container with opening can be placed over a pressure control device of the invention.

Preferably the attaching and/or connecting is by welding, preferably by laser welding. Preferably, the fluid container is laser welded circumferentially to said bottom plate at least twice; preferably said laser welding provides at least two circumferential seams; most preferably one of said seams is positioned at the edge of said fluid container.

Preferably attachment of the vessel to the closure is by laser welding. Preferably the fluid container is also laser welded to the form-matching bottom plate. This means of attachment provides for additional strengthening of the bottom part of the vessel and of the dispenser system.

Preferably the pressurizable fluid container is laser welded circumferentially to said bottom plate at least twice. Preferably said laser welding provides at least two circumferential seams. Most preferably one of said seams is positioned at the edge of said fluid container. This has for effect that a stronger connection is made. The seam at the edge of the fluid container results in less material splinters coming off the in a fall test. In case splintering does occur, a splinter will remain attached to the packaging. This provides safer packaging. In this way, the drop test for aerosol dispensers according to Aerosol Dispensers Directive 75/324/EEC can be passed.

Alternatively the fluid container is a metal can, preferably an aluminium can. For attaching a metal or aluminium can to the bottom plate, conventional techniques can be used.

Preferably a fluid container is selected with a wall thickness compared to the wall thickness of said pressurizable vessel of 1:1 to 1:5, preferably around 1:3. In a preferred embodiment, the wall thickness of said pressurizable fluid container is at least 0.5 mm. The wall thickness of the cylindrical vessel should at least be 0.5 mm. Typically, when non-technical PET is used, i.e. in absence of strengthening means, the wall thickness of the cylindrical vessel is around 1.4 mm.

By the term "pressure control means" as used herein, is meant means to provide pressure control. Such means can be a piston provided with a stem, whereby the stem is positioned inside an O-ring and the stem acts on the O-ring to provide a valve. An example of this pressure control means is provided in FIG. 1. Another means of providing pressure control is depicted in FIG. 2. Herein a stopper comprising a rim part acts on a fluid opening. Embodiments of such pressure control means are further provided in co-pending application PCT/EP2016/061840, the description thereof is incorporated herein by reference.

Preferably the pressure control means are obtained by injection moulding; preferably by injection moulding wherein the removal of the pressure control means from the mould is without use of a slide.

The pressure control means as depicted in FIG. 1 requires the use of a slide in the mould to make this part by an injection moulding process, as the piston is to be assembled with a sealing ring. This has for effect that more space is required than in a moulding process without the use of a slide. In addition, the use of a slide leaves a mark behind on the resulting injection moulded part, in the region where sealing needs to take place. This is a serious disadvantage, because the location is critical. It may lead to the failure of the pressure control. This problem can be overcome by using a central injection point in the injection moulding process of the pressure control means, particularly for the stopper.

Preferably, a stopper is used that is not provided with an undercut. This has for effect that injection moulding of the part is less complex. Use of a slider is not necessary. This has as benefit, that less space is required for the moulding equipment or consequently more parts can be made using the same space. A higher production capacity can be reached.

In a preferred embodiment, the stopper is made in a material that is self-sealing. This is advantageous as a sealing ring can be omitted to provide sealing. Examples of such materials are plastic materials with a Shore A hardness of 50-100, preferably 70-99. Preferably the material is selected form the list of polyolefin elastomers (POE'S), polyolefin compounds with a rubber phase, thermoplastic polyurethanes, polyesters or polyamides.

In a further aspect the invention provides in a pressurizable cylindrical vessel obtainable by a method according to an embodiment of the invention. The cylindrical shape has advantages over a shape with corners and edges for reasons of strength. It is more capable of withstanding pressure. Alternatively, the shape can be oval. In a preferred embodiment of a pressurizable cylindrical vessel according to the invention, the thermoplastic polymer is PET and the wall thickness of the vessel obtained is at least 1.0 mm, preferably at least 1.3 mm, more preferably at least 1.35 mm. Preferably the wall thickness of the pressurizable cylindrical vessel obtained is at most 1.9 mm, more preferably at most 1.7 mm, even more preferably at most 1.6 mm, and most preferably at most 1.5 mm. Most preferably the wall thickness of the pressurizable cylindrical vessel is 1.40 mm. The inventors have found that this thickness is optimal for providing sufficient strength even in absence of strengthening means in the composition and for providing an interesting cost position.

In a preferred embodiment, the ratio of the wall thickness of said pressurizable fluid container compared to the wall thickness of said pressurizable vessel is 1:1, more preferably 1:2, most preferably around 1:3. Most preferably the wall thickness of said pressurizable fluid container is 1.5 mm and the wall thickness of said pressurizable vessel is 0.5 mm.

Preferably said PET is virgin PET. More preferably the vessel is made from a composition comprising PET without strengthening means. Preferably the dimensions of the pressurizable cylindrical vessel are as follows: content of 80-90 ml, height of 50-55 mm, weight 15-20 g.

In a preferred embodiment of a pressurizable cylindrical vessel according to the invention, a sprue mark is located on said cylindrical vessel coinciding with the longitudinal axes of said cylindrical vessel and of said pressurizable vessel and is located outside of said cylindrical vessel facing the inside of said pressurizable vessel.

Use of a centrally located injection point and consequently a centrally located sprue mark in the resulting moulded part has for advantage that the part will display isotropic shrinkage instead of anisotropic shrinkage. This is beneficial for the strength of the moulded part.

In a further aspect the invention provides a bottom plate for receipt of a form-matching opening of a pressurizable vessel according to an embodiment of the invention, characterized in that the closure is obtained by injection moulding from a composition comprising a thermoplastic polymer, preferably PET, and strengthening means, preferably strengthening means selected from reinforcing fibers such as glass fibers, impact modifiers and combinations thereof. This has the advantage that the bottom part of the vessel in combination with the closure is strengthened. It will resist to pressurization better, with less or no deformation.

In yet another aspect the invention provides a pressurizable unit comprising a pressurizable vessel according to an embodiment of the invention and said vessel is provided by a bottom plate according to an embodiment of the invention.

Preferably the pressurizable vessel is cylindrical or oval shape. A shape without edges is advantageous for use in pressure applications.

In another aspect, the invention provides a pressure control system comprising a pressurizable unit according to an embodiment of the invention and one or more pressure control means obtained by injection moulding from a composition comprising a thermoplastic polymer, preferably PET, more preferably a composition free of strengthening means, most preferably a composition comprising PET that is free of strengthening means.

The advantage of this combination of three injection moulded parts is the provision of a qualitative and cost-effective system for providing pressure control in aerosol dispensers. Strength requirements, as set for plastic aerosol dispensers, can be met.

In an aspect, the invention provides a dispenser, preferably an aerosol dispenser, configured to dispense when in use a fluid contained in said dispenser at a constant predetermined pressure, comprising a container for containing said fluid and a pressure control system according to an embodiment of the invention for providing said constant predetermined pressure. Preferably said pressure control system comprises a cylindrical vessel diameter that is essentially form-matching to the diameter of said container over a circumferential wall area of at least 1 cm, preferably at least 5 cm, most preferably at least 8 cm. The form-matching aspect provides that the container provides additional support against pressurization to the vessel.

Preferably the dispenser comprises a fluid container made of PET, preferably made of PET by stretch-blow-moulding. Alternatively the container can be made from different biaxially stretchable plastics, such as polyethylene naphthalate (PEN), polyethylene-coisosorbite terephthalate (PEIT), polyethylene furanoate (PEF), polytrimethylene furandicarboxylate (PTF), high density polyethylene (HDPE), polypropylene (PP), polyamides, polystyrene, polyvinylchloride (PVC), cyclic olefin copolymer (COC).

More preferably the plastic container, preferably the PET container, comprises a rounded rim for receipt of a dispenser head. This type of rim is advantageous for receipt and clinching of existing dispenser heads. It allows more standard actuators and caps to be used. This has a large economical advantage, as standard caps are available from a larger number of suppliers.

Plastic containers of the prior art have a blocked rim. Use of this type of rim for receipt of a dispenser head, provides a dispenser height that is somewhat larger than classical plastic containers. As a result, standard actuators and caps can not be used. Use of custom made caps is necessary. However, these are less available and thus more expensive.

In a final aspect, the invention provides in the use of a pressurizable cylindrical vessel or a pressurizable unit or a pressure control system according to an embodiment of the invention, in a pressurizable dispenser. Preferably said pressurizable dispenser is an aerosol dispenser. Preferably the dispenser is a bag-on-valve type packaging or a piston based dispenser. This type of packaging provides a barrier between product load and propellant. This is especially advantageous for in cases where the product load is sensitive to air and the propellant is compressed air. The dispenser can have a plastic fluid container, preferably a PET fluid container, more preferably a PET container produced by injection stretch blow moulding. Alternatively, the dispenser can be a metal can. Combination of these packagings with one or more parts according to an embodiment of the invention, has for effect that low cost parts are provided for constant pressure delivery and control.

Where combinations of parts are described according to an embodiment of the invention, these are either combined or provided as a kit of parts.

The examples which follow illustrate the invention without limiting it.

Example 1: pressurizable vessel, bottom plate and pressure means. A first embodiment of a pressure control device (1) according to the invention is provided in FIGS. 1 (open position) and 2 (closed position). The pressure control device (1) for maintaining a constant predetermined pressure in a fluid container (not depicted) comprises a container shaped wall in the form of a cylinder (40) having an open end and a closed end, and a stopper (8) movable within said cylinder (40) to define a first chamber (4). A second chamber (3) is encompassing the cylinder (40) of the first chamber (4). It is fillable with a gas, preferably compressed air, which in use has a higher pressure than the pressure in the fluid container (not depicted). At least one fluid connection (9) is provided between the second chamber (3) and the fluid container. A closing member (7) movable relative to the first chamber (4) for releasing and closing said fluid connection (9) is provided between the second chamber (3) and the fluid dispensing container. The position of the closing member (7) relative to the second chamber (3) is at least dependent on the prevailing pressure in the fluid dispensing container and the prevailing pressure in the first chamber (4). In use the fluid connection (9) is released when the pressure in the fluid dispensing container decreases below the predetermined pressure, so that gas flows from the second chamber (3) to the fluid dispensing container and the pressure in the fluid dispensing container increases until the fluid connection (9) is closed by the closing member (7) as a result of the increased pressure in the fluid dispensing container. Said fluid connection (9) is characterized by an opening in the wall of the second chamber (3) facing the fluid container and said fluid connection (9) is provided with a circumferential protrusion (6) extending from the outer side of the wall towards the fluid dispensing container by a height H of 0.1-2.0 mm. As the cylinder (40) is an integral part of the wall of the second chamber, it has a shape that is very suitable for production using injection moulding. The vessel is made using a central injection sprue. The fluid connection is made after injection moulding of the part.

Example 2: An alternative embodiment of a pressure control device (1) according to the invention is provided in FIG. 3. It provides a vessel made by injection moulding. The "window parts" in the cylinder (40) are made in the injection moulding process. As the cylinder (40) is not closed, an alternative type of pressure control device is required compared with the embodiment shown in FIGS. 1 and 2. A device that can be used in combination with this type of vessel, is the device disclosed in WO 2005/82744 (not part of the invention). This device has more parts and is more time consuming to produce and assemble.

Figure 4:
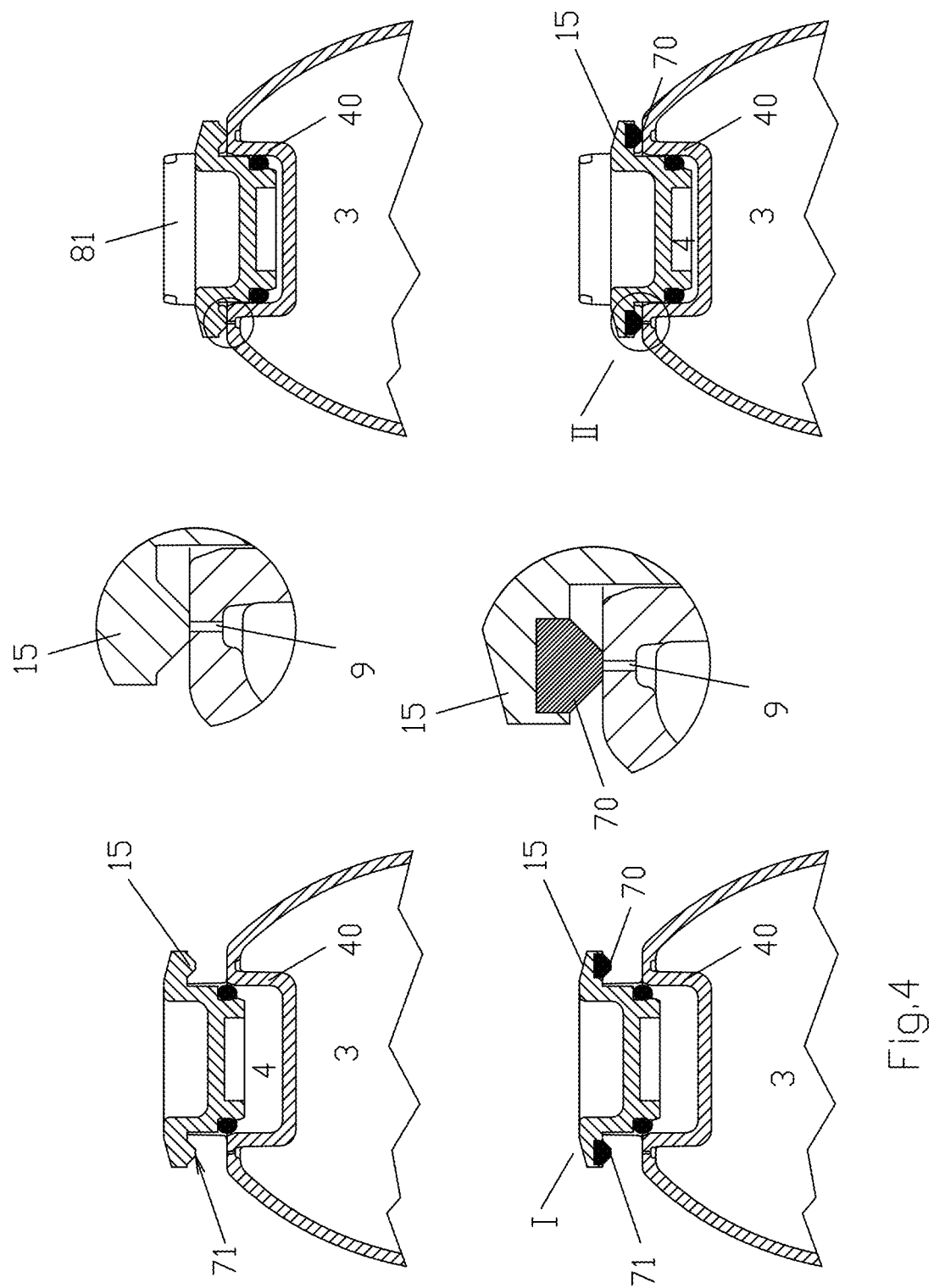
FIG. 4 provides graphic representations of an alternative embodiment of the invention. It provides a vessel with fluid connections (9) that is drilled in two steps, i.e. two diameters.

Example 3: In a preferred embodiment as depicted in FIG. 4, the fluid connection (9) is made by drilling in two steps. In a first step material is removed using a larger diameter. In a second step, a hole is drilled through the wall of the second chamber/pressurizable cylinder (3).

Examples 4 and 5 as depicted in FIGS. 5 and 6, provide individual parts of a pressure control device (1) before assembly. FIG. 5 depicts a bell shaped pressure reservoir (3) with a form fitting bottom plate (2) with a central bottom opening (41) and radiating from the central opening are dividers (69). The upper side of the bell shape is provided with tooth-shaped protrusions (70). These protrusions are circumferential to the opening of a cylindrical container (40). On the inward rim part is an opening (9) connecting the inner part of the pressure reservoir (3) with the outside. Also provided is a stopper (8) provided at the bottom with an X-ring (5). The stopper (8) has a collar (15) from which three protrusions (44-46) are extending radially outward. These serve for positioning of the stopper (8). In the stopper rim are provided three elastomer plugs (47, 48, 49). The stopper (8) should be positioned so that at least one of the plugs (47) can act on the opening in the rim of the pressure reservoir (3).

FIG. 6 provides a compact pressure control device, comprising a stopper with short neck, a bell shape pressure reservoir (3) that encompasses a cylindrical container (40). On the rim of the bell shape and container are provided three fluid openings (6, 6', 6") surrounded by three protrusions. A bottom plate (2) is provided comprising a plug (42) that closes of a central bottom opening (41). Radially extending from the central opening are plate dividers (69). The bottom plate (2) is form fitting with the opening of the pressure reservoir (3).

Examples 6-8 as depicted in FIGS. 7-9 show further embodiments of a pressure control device according to the invention. FIG. 7 shows an alternative pressure control device with click-in mechanism made possible by use of a quad-ring. By the term "quad-ring" as used herein is meant a solid elastomeric ring seal with a four-lobed cross-section, also known as x-ring. The use of a quad-ring is advantageous as the four lips create more sealing capacity and at the same time a groove for lubrication, which is very favourable for dynamic sealing. The most important advantage is the high stability for dynamic applications. In the situation that an O-ring rolls in the groove and creates torsion, a quad-ring will slide with no negative results. More resistance to spiral failure is provided. This embodiment has no protrusions (10) on the neck of the stopper. The collar serves as guiding means. The collar now serves the purpose of closure, click-system and guidance.

As can be seen, the pressure reservoir (3) is made of transparent plastic in the form of a bell shape. The wall at the top of the bell has the shape of a cylindrical container (40). The cylindrical container has a closed bottom end and an open top end. The circumference of the top end is provided with a rim from which teeth-like protrusions extend (70). At the extremities the teeth-like shapes are slightly thicker. The bell shaped pressure reservoir has an open bottom end. This bottom is form fitting with a bottom plate (2). The bottom plate was fitted into the open bottom end of the bell shaped pressure reservoir (3). It was laser welded to the bottom plate. The pressure device is further comprising a stopper (8) with a collar provided with a flat closure means executed in an elastomeric material. The neck (34) of the stopper is provided with halve of an X-ring in elastomeric material (5). The flat side of the X-ring is positioned towards the neck of the stopper. The rim part of the container is provided with a fluid connection (9) connecting the inside of the pressure reservoir (3) with the outside. It is provided with a needle which is slightly protruding from the rim surface. In relation to the teeth-like protrusions (70), the fluid connection is provided inside the circle formed by the teeth-like protrusions (70). The teeth-like shapes provide flexibility for insertion of the stopper (8). When the stopper (8) is clicked into the cylindrical container the teeth-like shapes (70) slightly bend outwards and move back into their original position again.

FIG. 8 provides an embodiment wherein the stopper (8) is executed with a collar (15) having three protrusions (44, 45, 46) that are form fitting with the spacing between the teeth-shaped protrusions (70) on the open end of the cylindrical container (40). The collar of the stopper is not provided with an elastomeric sealing means applied on the circumference of the rim. Instead it is provided in three parts evenly distributed over the rim. They are provided as plugs (47, 48, 49) in the collar of the stopper. The plugs are made from an elastomeric material.

FIG. 9 provides an embodiment wherein the stopper (8) is provided with a movable closure ring (7) that can act as a liquid slot. Upon positioning of the stopper (8) in the container (40), the closure ring (7) closes off the needle. Product can be filled in a container with this device, without the risk of product ending up in the pressure container (3). After filling with product, the pressure container can be filled with air. Pressure will build up and the needle (26)/fluid connection (9) will be freed. Pressure will build up in outside the pressure container (3). Once the pressure outside the container is larger than in the first chamber (4), the stopper will be pushed down in the cylinder (40) and the collar (15) of the stopper (8) will move against the closure ring (7). The closure ring is restored in the original position. It functions like a return mechanism.

Examples 8-10 as depicted in FIGS. 10-12, provide pressurized fluid containers (60) comprising a pressure control device (1) according to an embodiment of the invention and a fluid dispensing valve (51). The pressure control system (100) is further provided with either a dip-tube (68) or movable piston (52) with ribs (53-57). The bottom openings (41) are provided with Nicholson plugs (42). The bottom plates in FIGS. 10-12 are curved and provided with dividers (69). This is especially advantageous for being resistant to deformations when holding pressurized air. As can be seen in FIG. 12, the dip-tube can be provided to reach all the way to the bottom plate (2). The dimensions of the pressure reservoir can be adjusted such that it can be surrounded by fluid. This gives the impression to the consumer that the container is fully used (FIG. 27). From FIG. 10 it can be seen that the stopper can be provided so that it fits with the indentation (65) in the movable piston (52). This has for effect that a compact stack can be provided. It provides for optimal use of space for holding product. The pressure control systems of FIG. 10-12 are further provided with a dispensing valve (50) and spray head with dispensing opening (64).

Figure 13:
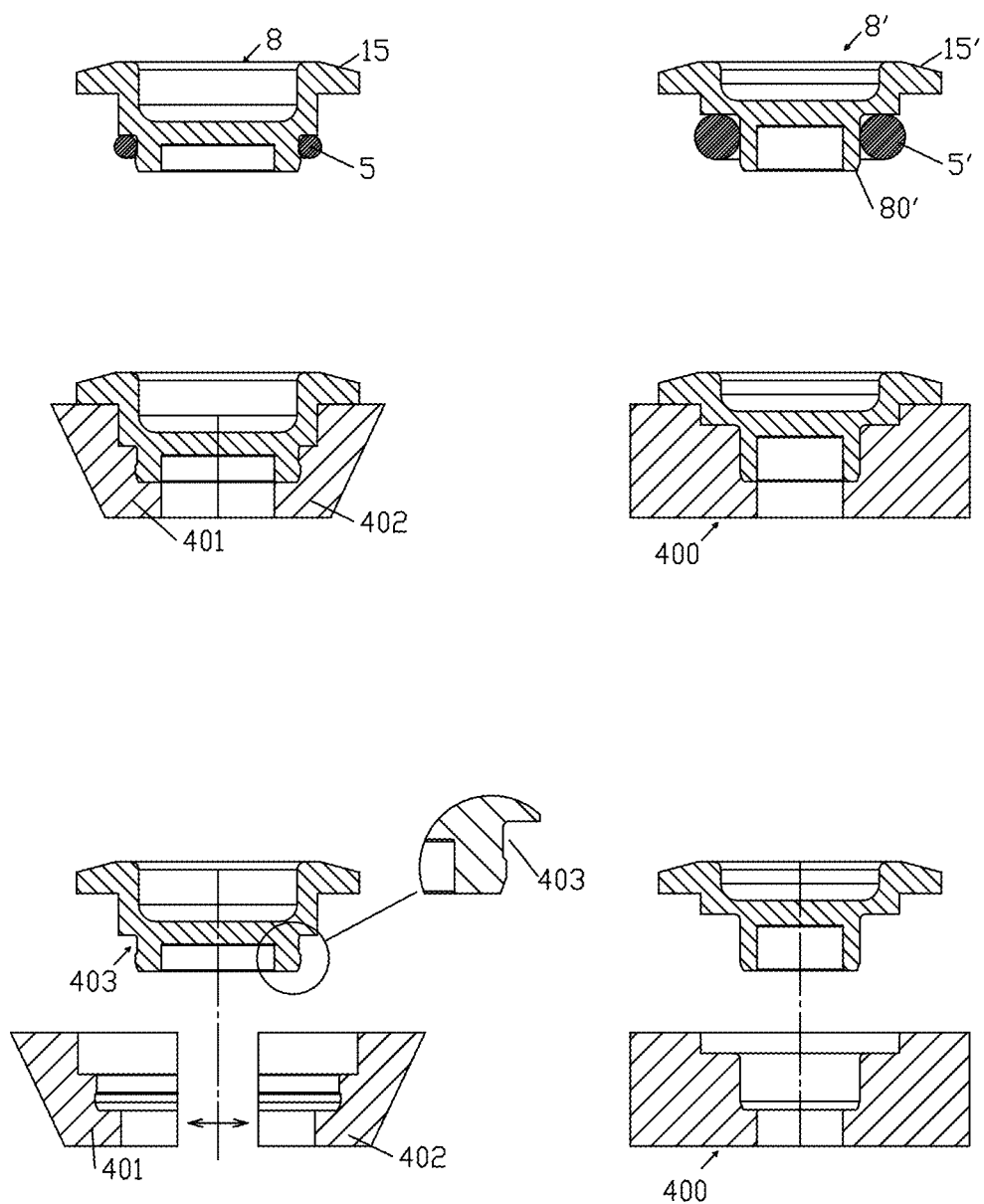
FIG. 13 provides a schematic representation of a seam obtained by a double welding process.

Example 11: FIG. 13 provides a schematic representation of a pressure control means manufactured using an injection mould with (left) and without (right) the use of a slide. The shape of the stopper as depicted on the left, does not allow the use of an integral injection mould. Due to the protrusion on the bottom of the stopper, it can not be removed from a single piece mould. The stopper with design as depicted o the right has no groove to hold the sealing ring. This shape allows the use of a single piece injection mould. A problem encountered with stoppers without groove to hold a sealing ring, is that in use, the stopper moves upwards and leaves the sealing ring. The inventors have found that by using a thicker ring, the sealing ring will accompany the stopper.

Figure 14:
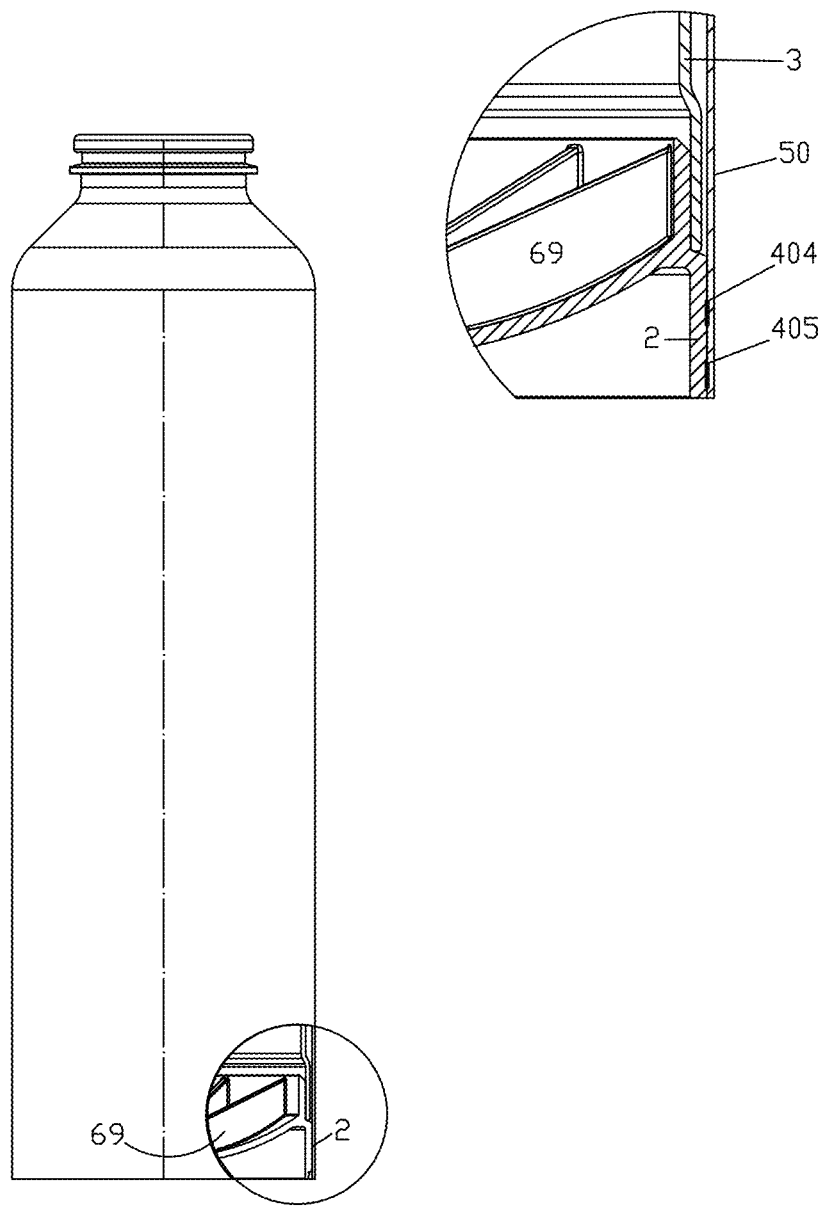
FIG. 14 provides a schematic representation of aerosol dispenser heads.

Example 12: In a preferred embodiment, welding is used twice to attach the fluid container to the bottom plate, as depicted in FIG. 14. This double seam is advantageous for permanently connecting container and bottom plate. It provides additional support and strength to a pressurizable vessel. It also has for effect that aerosol dispensers in PET pass the drop test for plastic containers better. In case there is chipping, the chip will remain attached due to the seam.

Figure 15:
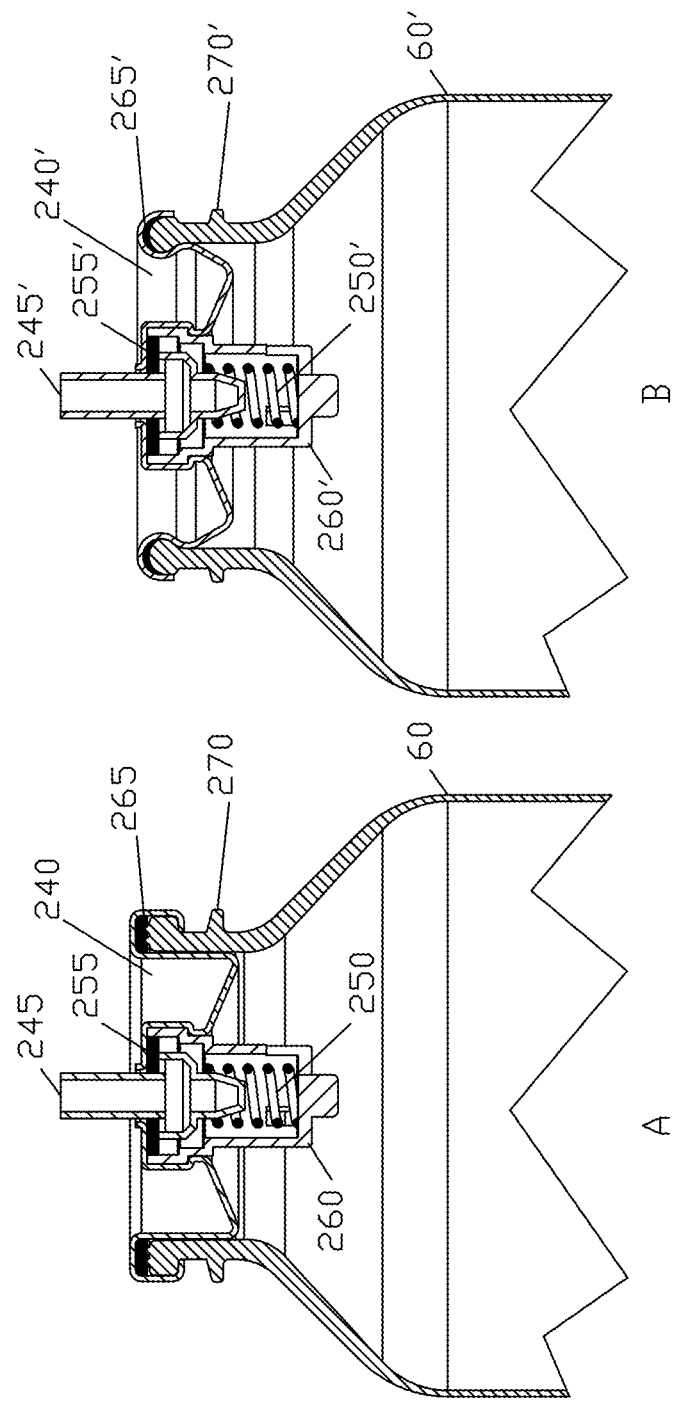
FIG. 15 provides a schematic representation of a pressurizable cylindrical vessel comprising an insert that is manufactured as a separate part (230).

Example 13: As depicted in FIG. 15, a PET container can be provided with different configurations of aerosol dispenser heads crimped to the PET container. The aerosol dispenser head comprises a valve mounting cup (240) holding a valve arrangement (245) with a housing (260), spring (250) and internal gasket (255). An external gasket (265) is positioned between the valve mounting cup (240) and the fluid dispensing container (60). This container is a PET container made from injection stretch blow moulding, as can be derived from the collar part with holding rib (270). The opening of the fluid dispensing container can display a blocked rim (figure on the left) as available in standard containers, or a rounded rim (figure on the right) as part of the invention. In standard containers, a dispenser head is crimped on the container and folds around the blocked rim on the outside. In the fluid container according to an embodiment of the invention, the rounded rim is capable of receiving the dispenser head by crimping and folding around the rounded rim on the inside.

Example 14: A preferred embodiment of a pressurizable vessel (3) according to the invention is schematically represented in FIG. 16. It provides a vessel comprising two parts, namely a cylindrical vessel (3) with a cylindrical receptacle in the top (81) and an insert (230) comprising the cylindrical chamber (40) for housing the stopper (8). It can be seen that the general principle of locating the one or more fluid connections (9) outside of the cylindrical chamber (40) is preserved. Two protrusions can be seen (6). One protrusion has a fluid connection (9) in its center (protrusion on the left), the second protrusion (6) does not have a fluid connection. It will be clear to the skilled person, that one or more protrusions can also be provided in the stopper instead for acting on a fluid connection (9). Working with an insert such as the one depicted (230) has the consequence that the part needs to be connected to the pressurizable vessel (3). This can be achieved by welding, preferably by laser welding. A stopper (8) suitable for use with the insert (230) and pressurizable vessel (3) is provided. The example provided (8) displays a stopper with a collar or rim part (15) that is circumferential to the neck of the stopper. A skilled person will understand that a stopper with a rim consisting of one or more parts, the number being equal to the number of fluid connections present in the insert (230) is also suitable. Another practical feature displayed in the Figure is the protrusion (79) at the top of the cylindrical vessel (3). It provides a snap-fit connection on insertion of the stopper into the cylindrical receptacle (81). It serves to hold the stopper in place. Stopper movement is controlled between a position where it closes the one or more fluid connections (9) and the rim of the cylindrical receptacle (81) in which position the one or more fluid connections (9) are open.

Figure 17:
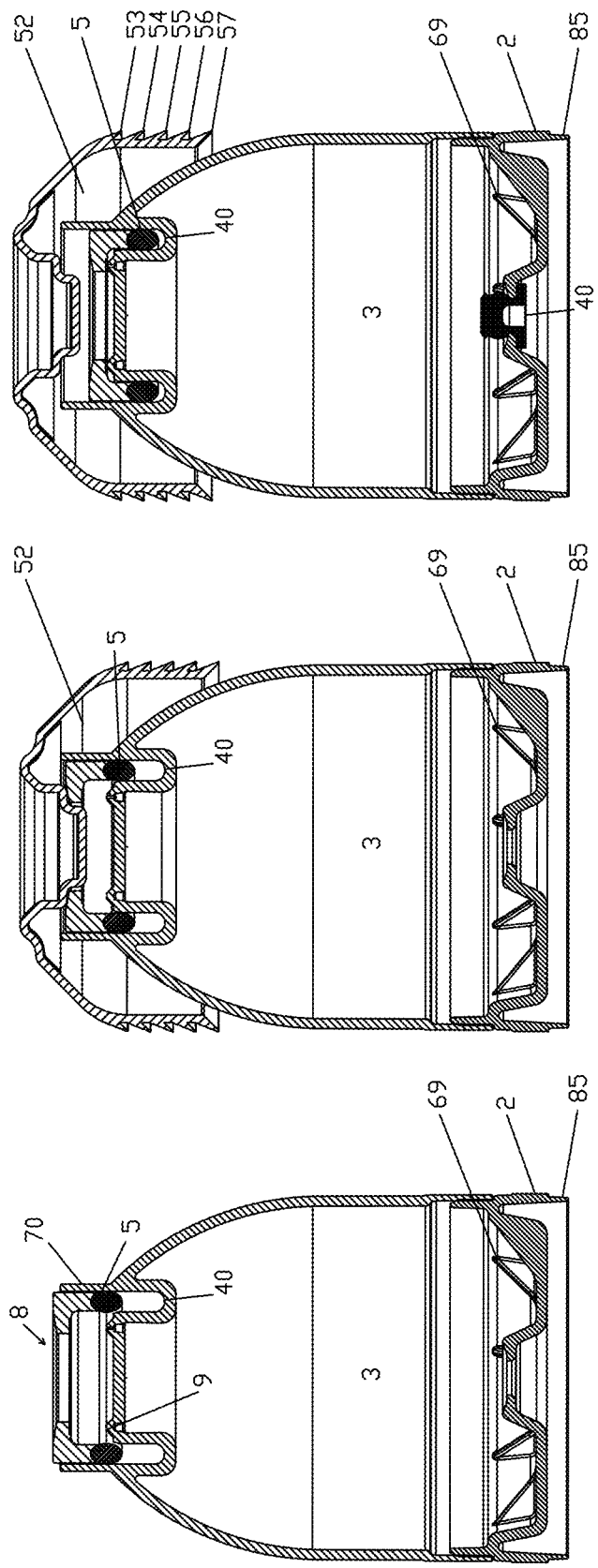

Example 15: A preferred embodiment of a pressure control device (1) according to the invention is graphically represented in FIG. 17. Preferably the device is provided together with a piston (52), in the form of a kit of parts, or as a combination in which the piston is mounted on the second chamber. The pressurizable vessel (3) (second chamber) is provided with a ring shaped first chamber (40; reference pressure room). In this case the sealing in the first chamber is done on both the inside and the outside by the same O-ring (5). This has as advantage that it can be constructed with an open stopper (8). Consequently, an extreme lightweight version is provided. The bottom plate (2) is provided with strengthening fins (69) and an opening for insertion of a Nicholson plug (40). It is designed to provide a snap-fit connection (85) with the fluid container (not shown).

The invention claimed is:

1. A method for manufacturing a pressurizable cylindrical vessel for use in a pressure control system for maintaining a constant predetermined pressure in a fluid container configured to dispense when in use a fluid contained in said fluid container at said constant predetermined pressure, comprising the steps of: forming out of a composition comprising a thermoplastic polymer, a pressurizable cylindrical vessel, wherein said vessel on one end has a cylindrical insert configured to receive one or more pressure control means and on the opposite end has an opening configured to receive a form-matching bottom plate, wherein said forming is by injection moulding, said thermoplastic polymer or PET has an intrinsic viscosity of 0.65-0.75, and wherein a polymer injection sprue is used located on the longitudinal axes of said pressurizable cylindrical vessel, thereby providing a sprue mark located on said cylindrical insert, coinciding with the longitudinal axes of said pressurizable cylindrical vessel and said cylindrical insert, and on an outside of said cylindrical insert facing an inside of said pressurizable cylindrical vessel.

2. The method according to claim 1, wherein said thermoplastic polymer composition, is free of fiber reinforcements and/or free of impact modifiers.

3. The method according to claim 1, comprising the step of providing the wall of the cylindrical vessel with one or more fluid connections; alternatively said one or more fluid connections are made during injection moulding.

* * * * *